United States Patent [19]

Risch et al.

[11] Patent Number: 6,085,009
[45] Date of Patent: Jul. 4, 2000

[54] WATER BLOCKING GELS COMPATIBLE WITH POLYOLEFIN OPTICAL FIBER CABLE BUFFER TUBES AND CABLES MADE THEREWITH

[75] Inventors: Brian G. Risch, Hickory; Jeffrey Auton, Maiden; Olivier Tatat, Hickory, all of N.C.

[73] Assignee: Alcatel, Paris, France

[21] Appl. No.: 09/078,407

[22] Filed: May 12, 1998

[51] Int. Cl.[7] .................................................. G02B 6/44
[52] U.S. Cl. ........................................ 385/109; 523/173
[58] Field of Search ............................... 385/123–128, 385/109, 100, 110

[56] References Cited

U.S. PATENT DOCUMENTS

| | | | |
|---|---|---|---|
| 3,996,413 | 12/1976 | Foord et al. | 174/23 |
| 4,356,342 | 10/1982 | Verne | 174/23 |
| 4,551,569 | 11/1985 | Verne | 585/6.6 |
| 4,617,422 | 10/1986 | Hagger | 174/23 |
| 4,645,298 | 2/1987 | Gartside, III | 350/96.23 |
| 4,709,982 | 12/1987 | Corne et al. | 350/96.23 |
| 4,786,138 | 11/1988 | Buckley | 350/96.23 |
| 4,830,459 | 5/1989 | Chicken et al. | 350/96.23 |
| 4,859,023 | 8/1989 | Eichenbaum et al. | 350/96.23 |
| 4,889,717 | 12/1989 | Covington et al. | 428/304.4 |
| 4,892,382 | 1/1990 | Story et al. | 350/96.23 |
| 4,963,698 | 10/1990 | Chang et al. | 174/77 |
| 5,000,539 | 3/1991 | Gareis | 350/96.23 |
| 5,029,974 | 7/1991 | Nilsson | 350/96.23 |
| 5,082,380 | 1/1992 | Sutehall et al. | 385/114 |
| 5,185,841 | 2/1993 | Bosisio et al. | 385/100 |
| 5,276,757 | 1/1994 | Levy et al. | 385/109 |
| 5,285,513 | 2/1994 | Kaufman et al. | 385/109 |
| 5,295,215 | 3/1994 | Fedoroff et al. | 385/109 |
| 5,306,867 | 4/1994 | Connole et al. | 174/23 |
| 5,348,669 | 9/1994 | Brauer et al. | 252/28 |
| 5,384,880 | 1/1995 | Keller et al. | 385/109 |
| 5,433,872 | 7/1995 | Brauer et al. | 252/28 |
| 5,461,195 | 10/1995 | Freeman et al. | 174/23 |
| 5,574,816 | 11/1996 | Yang et al. | 385/109 |
| 5,672,640 | 9/1997 | Brauer | 523/173 |
| 5,761,362 | 6/1998 | Yang et al. | 385/109 |
| 5,902,849 | 5/1999 | Heucher et al. | 524/484 |
| 5,911,023 | 6/1999 | Risch et al. | 385/100 |

FOREIGN PATENT DOCUMENTS

| | | |
|---|---|---|
| 0422573 | 4/1991 | European Pat. Off. . |
| 0510967 | 10/1992 | European Pat. Off. . |
| 93/22696 | 11/1993 | WIPO . |
| 9322696 | 11/1993 | WIPO . |

OTHER PUBLICATIONS

Hatori et al., "Optimal Design of Jelly Compound for Optical Cable", *International Wire & Cable Symposium Proceedings*, 1988.

*Effects of Waterproofing Cable Fillers on Some Physical Properties of Polyethylene Cable Materials*, by C. Gieniewski and L. L. Blyler, Jr. in *International Wire & Cable Symposium Proceedings 1981* at p. 270.

*Optimal Design of Jelly Compound for Optical Cable*, T. Hactori, N. Akasaka, M. Fukuma, S. Masuda and S. Suzuki in *International Wire & Cable Symposium Proceedings 1988* at p. 12.

*Investigation on the Rheological Characteristics of Filling Compounds for Optical Fibre Cables*, by R. W. Corne and J. Broad in *International Wire & Cable Symposium Proceedings 1988* at p. 449.

*DSC Study on Crystallinity of PE Aged in Waterproofing Cable Jelly*, by D.M. Fann, H.F. Lin and H.Y. Shih in *ANTEC '89* at p. 1178.

*Versatile High Performance Filling Compounds for Telecoms Cables*, by J.R. Bury and.

*Primary Examiner*—John D. Lee
*Assistant Examiner*—Michelle R. Connelly-Cushwa
*Attorney, Agent, or Firm*—Ware, Fressola, Van der Sluys & Adolphson LLP

[57] ABSTRACT

A water blocking gel which is compatible with polyolefin optical fiber cable buffer tubes is disclosed. The water blocking gel comprises a polyolefin oil, wherein only a very small fraction of the polyolefin species have a molecular weight below about 2000. The gel also includes a thixotropic agent, and a thermal oxidation stabilizer. The gel is relatively low cost, does not cause substantially swelling of the polyolefin buffer tubes in contact therewith and does not degrade the buffer tube's physical properties.

21 Claims, 12 Drawing Sheets

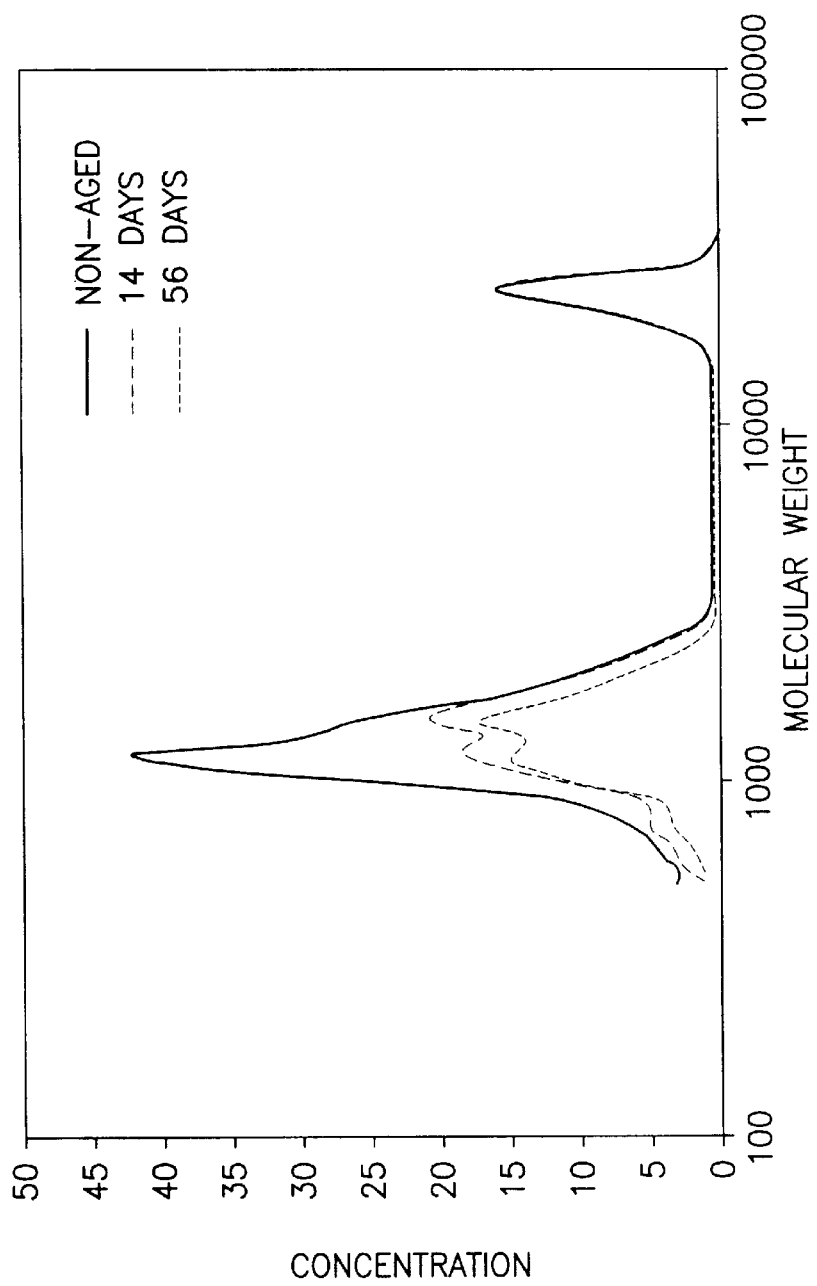

WATER BLOCKING GELS COMPATIBLE WITH POLYOLEFIN OPTICAL FIBER CABLE BUFFER TUBES AND CABLES MADE THEREWITH

BACKGROUND OF THE INVENTION

1. Field of the Invention

The present invention relates to telecommunications cables. More particularly, the present invention relates to water blocking gels for optical fiber telecommunications cables that are compatible with optical fiber cable buffer tubes made from polyolefin materials.

2. Description of the Prior Art

Optical fiber cables have been used by the telecommunications industry for a number of years to transmit information at very high rates over long distances. Optical fiber cables come in a variety of configurations, including: cables with a centrally located single buffer tube containing one or more optical fibers; cables with a plurality of buffer tubes stranded in a helical or alternating helical arrangement about a central strength member; and cables with slotted cores in which a plurality of optical fibers reside.

In the cable varieties in which the optical fibers are housed in a buffer tube, the buffer tubes' primary function is to protect the delicate optical fibers housed therein. Accordingly, control of the modulus, percent elongation to break, coefficient of thermal expansion, shrinkage, swelling and other physical properties of the buffer tubes is very important. Until recently, polyolefin materials, although having many desirable properties such as low temperature flexibility, low cost and good processability, were not used for optical fiber cable buffer tubes because such materials had a reduced modulus relative to other engineering resins such as polybutylene terepthalate (PBT). However, recent advances, as disclosed in U.S. Pat. No. 5,574,816, to improve the modulus and compression resistance of polyolefin materials, such as low cost impact modified nucleated isotactic polypropylene (i-PP), have made such materials useful for buffer tubes for optical fiber cables.

Although materials like i-PP can enable the manufacture of low cost buffer tubes, such material is not compatible with many traditional, low cost polyolefin based water blocking compounds. The incompatibility is caused by favorable interactions between polyolefin based water blocking gels and the i-PP buffer tube material. As an alternative, polyol based water blocking gels have been developed which offer better compatibility because such materials have a less favorable interaction with the i-PP material. See U.S. Pat. Nos. 5,348,669, 5,433,872 and 5,672,640. Polyol based gels are generally more compatible with water and therefore allow greater amounts of water to be absorbed into the gels. However, as compared to the traditional polyolefin based water blocking gels which have been used in the past with PBT based buffer tubes, the polyol gels may have a greater cost, and therefore, they can reduce the cost savings realized by the use of polyolefin based buffer tubes.

In addition to cost savings, interactions with additives such as anti-oxidant compounds are also an important consideration when determining whether a water blocking gel is compatible. Non-compatible gel materials can swell buffer tube polymers and are able to extract the additives therein and reduce the thermo-oxidative stability of the buffer tubes. Haslov, P. and S. K Ovgaard, "Degradation of PP in Jelly-Filled Cables, IWCS Proceedings (1993), pp. 65–70 teaches that antioxidants can be leached out of the polymer system especially if they are supersaturated.

SUMMARY OF THE INVENTION

It is an object of the present invention to provide a water blocking gel which is compatible with polyolefin based buffer tubes of an optical fiber cable.

It is another object of the present invention to provide a water blocking gel which does not cause excessive swelling of polyolefin based buffer tubes of an optical fiber cable.

It is yet another object of the present invention to provide a water blocking gel which does not seriously degrade the physical properties of polyolefin based buffer tubes of an optical fiber cable.

These objects are accomplished, at least in part, by a water blocking gel for an optical fiber cable buffer tube made from a polyolefin resin material. The gel comprises a polyolefin oil wherein substantially all fractions of the polyolefin oil have a minimum molecular weight above about 2000. The gel also includes a thixotropic agent and a thermal oxidation stabilizer.

Other objects and advantages of the present invention will become apparent to those skilled in the art from the following detailed description read in conjunction with the attached drawing and claims appended hereto.

BRIEF DESCRIPTION OF THE DRAWINGS

The drawings, not drawn to scale, include:

FIGS. 7A & 7B are graphical illustrations GPC data for polyolefin gel as a function of exposure to impact polypropylene buffer tubes;

DETAILED DESCRIPTION OF THE PRESENT INVENTION

Figure 1:
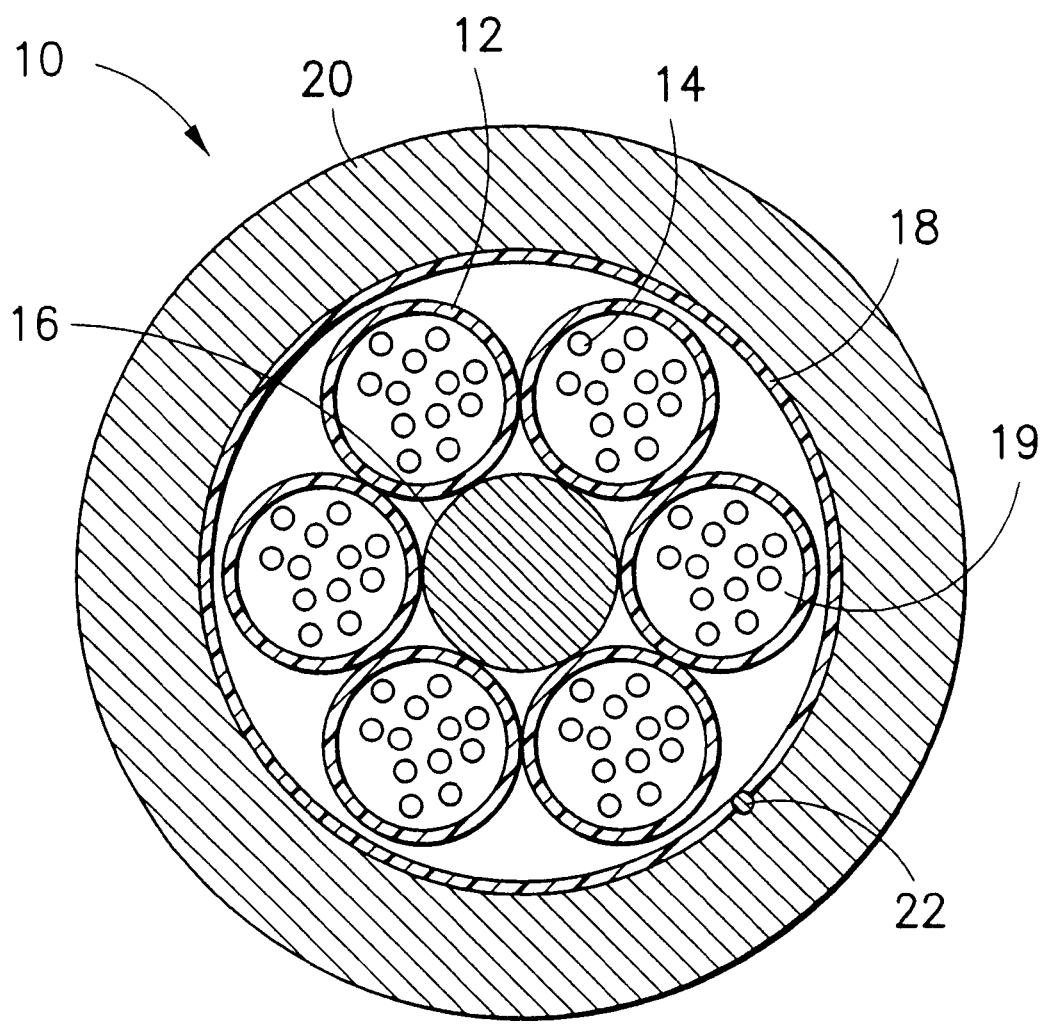
FIG. 1, which is a cross-sectional schematic diagram illustrating a stranded optical fiber cable having a plurality of buffer tubes and a water blocking gel therein.

FIG. 1 illustrates a typical stranded optical fiber cable. The cable 10 has a core comprised of a plurality of buffer tubes 12, each of which house optical fibers 14, stranded about a central strength member 16. A core wrap 18 may be positioned over the core. A protective outer jacket 20 is disposed over the core region on the exterior of the buffer tubes. A ripcord 22 is provided near the interface of the wrap 18 and the outer jacket 20. Water blocking gels 19 are typically disposed within the buffer tubes 12, and may also be disposed within the core outside of the buffer tubes, if desired.

Preferably, the buffer tubes 12 of the optical fiber cable are made with low cost polyolefin materials, such as polyethylene-polypropylene copolymer materials. As disclosed in U.S. Pat. No. 5,574,816, polypropylene-polyethylene copolymer resins or compounds, which are less expensive than PBT, polycarbonate or Nylon 12 can be used to make buffer tubes for optical fiber cables by incorporating nucleating agents in the polypropylene-polyethylene copolymer melt prior to extrusion of a buffer tube or by incorporating filler materials with the copolymer during the extrusion of a buffer tube. Nucleating agents that can be used in the resin include: inorganic materials such as talc, mica, silica, carbon black and kaolin; salts of aliphatic monobasic or dibasic acids or arylalkyl acids such as sodium succinate, sodium glutarate, sodium caproate, sodium 4-methylvalerate, aluminum phenylacetate and sodium cinnamate; or alkali metal or aluminum salts of aromatic or alicyclic carboxylic acids, such as aluminum benzoate, sodium or potassium benzoate, sodium β-naphthoate, lithium benzoate, and aluminum term butylbenzoate. The nucleating agents form nuclei for growth of crystals in the polypropylene-polyethylene copolymer melt. A high degree of crystallinity and a more uniform crystalline structure is obtained by adding the nucleating agent to the copolymer melt. The nucleating agent increases the Young's modulus, yield stress, tensile strength, compression resistance and dimensional stability of the copolymer; as well as reduce the coefficient of thermal expansion. Any nucleating agent added to the polypropylene-polyethylene melt to improve the above mentioned physical properties should be homogeneously dispersed in the polymer melt in a fine form (approximately 1 to 10 $\mu$m in size). It has been found that concentrations of up to 0.5 weight percent provide the maximum enhancements of the copolymer's physical properties. It has also been found that higher concentrations of nucleating agents do not produce further enhancements of the copolymer's physical properties, and likewise, a buffer tube made thereof.

While the polyolefin materials can now be used for making buffer tubes, such material is generally incompatible with the typical low cost, polyolefin water blocking gels due to polymer/solvent interactions that induce swelling of the polymer by the gel especially at elevated temperatures. The swelling causes a reduction in the physical properties such as compression resistance for example.

It has been discovered that these typical prior art filling gels have mixtures of materials or fractions with varying molecular weight which is generally much lower than the average molecular weight of the polymeric buffer tube material. According to the Flory-Huggins theory of polymer/solvent compatibility, the Gibbs free energy of mixing is represented by the following equation:

$$\Delta G_{Mix} = \Delta H_{Mix} - T\Delta S_{Mix}$$

where $\Delta G_{Mix}$ is the Gibbs free energy of mixing, $\Delta H_{Mix}$ is the enthalpy of mixing, and $\Delta S_{Mix}$ is the entropy of mixing. If the value of $\Delta G_{Mix}$ is minimized, the polymer/solvent interaction is most favorable and a polymer will be dissolved or swelled by a solvent. If the value of $\Delta G_{Mix}$ is large, however, polymer/solvent interaction is generally unfavorable and the polymer will not be dissolved or swelled by the solvent to any significant degree. For a polymer/solvent system where the polymer and solvent are chemically dissimilar, the value of $\Delta H_{Mix}$ is typically large and positive which gives rise to a tendency towards immiscibility between the solvent and the polymer. The contribution of $\Delta H_{mix}$ to $\Delta G_{mix}$ follows the general rule that like dissolves like. Thus, for chemically similar species, the value of $\Delta H_{Mix}$ may be near zero or even negative. In very basic terms, while the $\Delta H_{Mix}$ term of the above equation describes the "like dissolves like" rule for solvents, however, the entropy term can effect the total free energy of mixing, as well. Greater entropy, or disorder, is favored thermodynamically, the combinational entropy of mixing is a function of both polymer and solvent molecular weight and the entropy contribution to $\Delta G_{mix}$ is proportional to temperature. As the molecular weights of the polymer and solvent decrease, the number of possible configurations of the polymer-solvent system increase and the combinational entropy of mixing increases.

According to the present invention, it has been further found that water blocking gels generally comprising a polyolefin oil, a thixotropic or pseudoplasticity modifier and a thermal oxidative stabilizer can be used with polyolefin based buffer tubes without causing significant swelling provided that the polyolefin oil component of the polyolefin based water blocking gel has little or no low molecular weight component. In experiments conducted on i-PP buffer tubes made according to U.S. Pat. No. 5,574,816, it was observed that the fractions of polyolefin oils having a molecular weight below about 1000 were strongly absorbed by the buffer tube material causing substantial swelling thereof. The fractions or components having a molecular weight above about 2000 did not have a strong interaction with the material. The methods set forth in ASTM D3593 were utilized to determine whether an oil had fractions or components having a molecular weight below the 2000.

According to the present invention, ideally polyolefin oils used in the gel of the present invention should have no molecular weight fraction or component below about 2000. However, polyolefin oils having a small fraction (up to about 3 weight percent) of low molecular weight species (below about 2000) may be used to make a suitable water blocking gel for an optical fiber cable containing polyolefin buffer tubes. Such oils include: polybutene oils, poly-n-decene oils, poly-n-pentene oils, poly-n-hexene oils, poly-n-octene oils, fractionated mineral oils, and alpha-olefin oils generally. A mixture of these oils may also be used. Whether a single oil is used or a mixture of oils is used in formulating the water blocking gel, only a small fraction (about 3 weight percent) of the polyolefin oil in the oil mixture can have a low molecular weight below about 2000 as measured by ASTM D3593. That is, substantially about 97 weight percent of the oil in the gel has polyolefin species which have a molecular weight above 2000. The thixotropic or pseudo plasticity modifier may be fumed silica which is preferably hydrophobic, a polymeric thixotropic modifier, such as Krayton rubber, or a combination of both. Thermal oxidation stabilizers can be any material which is capable of functioning as a thermal oxidation stabilizer. Typical thermal oxidative stabilizers that may be used are hindered phenolics, hindered amines and phosphite synergists.

In one preferred composition, about 88 to 95 weight percent polybutene oil, from about 5 to 10 weight percent fumed silica and from about 0.1 to 2 weight percent hindered phenolic thermal oxidation stabilizer were combined to make a water blocking gel suitable for use with the above described buffer tubes. Alternatively, 5 to 20 weight percent of a high molecular weight (above about 20,000) polymeric pseudoplasticity modifier such as Krayton rubber, may be added instead of the fumed silica. The polybutene oil selected had substantially little or no fraction (less than about 3 percent by weight) with a molecular weight below 2000. The composition described above was made by mixing the polyolefin oil, fumed silica and thermal oxidation stabilizer in a high shear mixer and mixed in a manner to ensure that the fumed silica was well dispersed without inducing excess shear to the composition. The mixer can be evacuated to prevent air entrapment in the gel during mixing.

In an alternative composition, the polyolefin oil of the gel may comprise an oil mixture of about 10 to 50 weight percent polybutene oil and about 90 to 50 weight percent poly-n-decene oil, both oils having little or no fractions (about up to 3 percent is permitted) of polyolefin species with a molecular weight below about 2000. The oil mixture comprised about 88 to 95 weight percent of the gel. About 5 to 10 weight percent fumed silica and from about 0.1 to 1.5 weight percent of a hindered phenolic type thermal oxidation stabilizer and about 0.1 to 0.5 weight percent of a hindered amine type stabilizer are also to be included in the alternative composition for the gel. In addition to hindered amine stabilizers, phosphite synergists may also be added to the gel to enhance oxidative stability.

Figure 2:
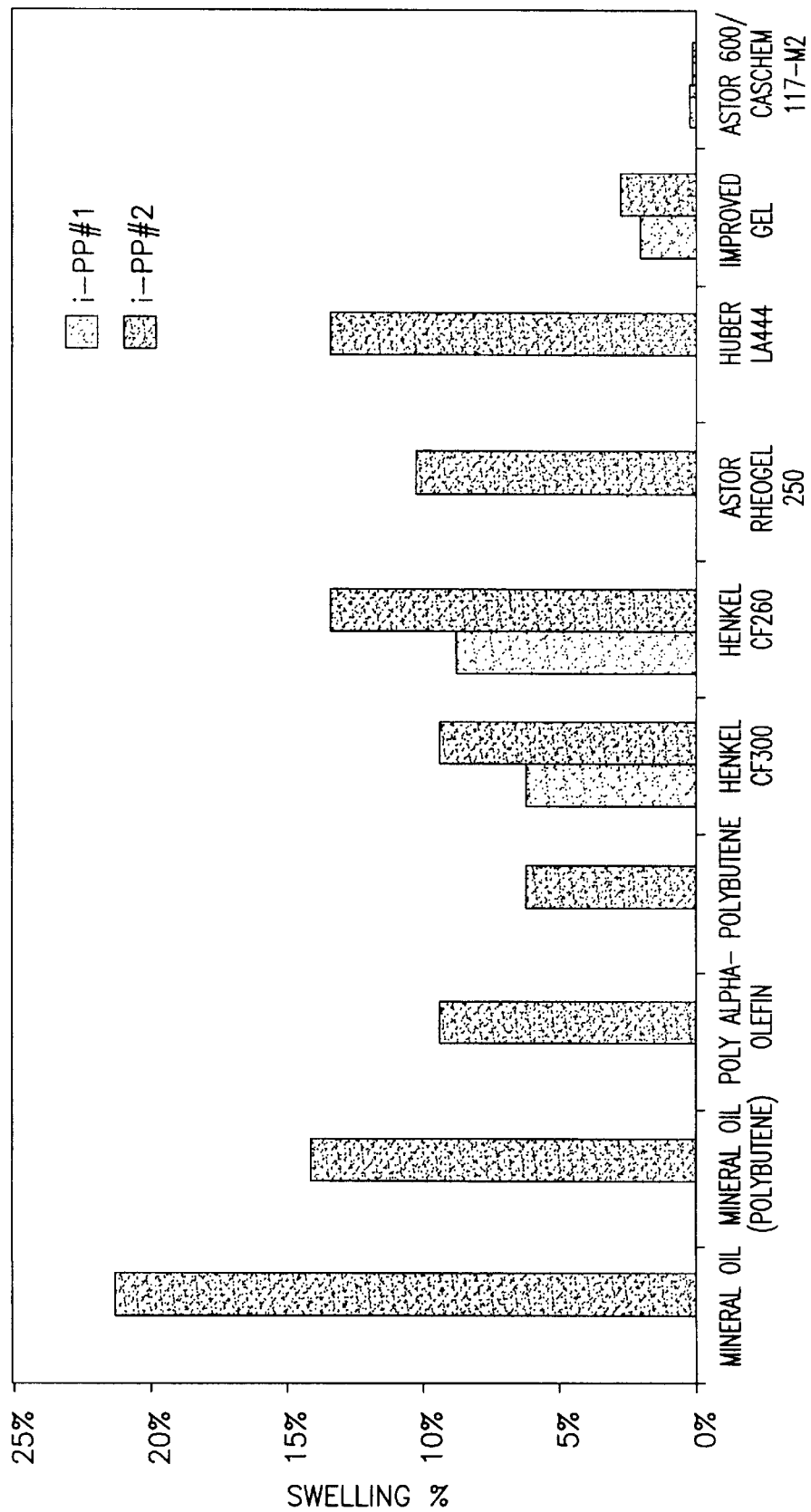
FIG. 2, which is graphical illustration of the swelling results for two grades of nucleated impact modified polypropylene in various gels and base oils.

FIG. 2 illustrates the varying swelling effects of different gels and filling gel base oils on two grades of nucleated, impact modified polypropylene with about 8% ethylene comonomer content. The illustrated results are change in mass due to swelling after 30 days exposure to gels at 85° C. The mineral oil, polybutene, and poly alpha-olefin base oils traditionally used to produce gels typically contain substantial fractions of components with molecular weight below about 2000 and can swell polyolefin buffer tube materials by 6% or more. Henkel CF-300, Henkel CF-260, Astor Rheogel 250, and Huber LA-444 are all hydrocarbon or polyolefin based gels with substantial low molecular weight component fractions that have a number average molecular weight of 2000 or below. This low molecular weight component or species is characteristic of a mineral oil or another low molecular weight olefin. The gel of the present invention (referred to as "improved gel") is a polyolefin based gel that does not have this low molecular weight fraction. Swelling data for two polyol based gels, Astor 6000 and Caschem 117-Mi, are also given for reference. FIG. 2 illustrates that substantial elimination of the low molecular weight component fraction below 2000 dramatically reduces buffer tube swelling.

Figure 3:
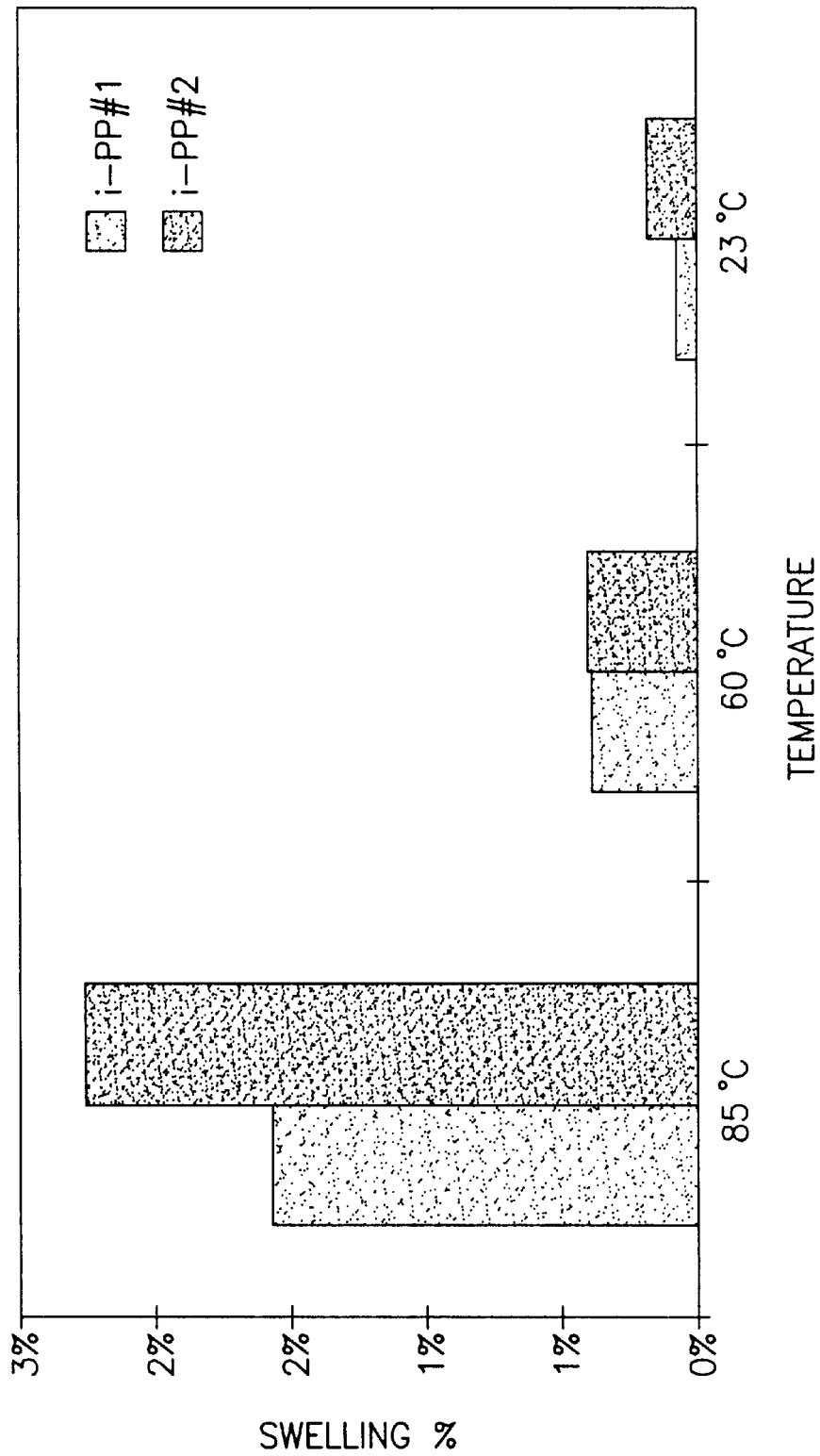
FIG. 3, which is a graphical illustration of the effect of temperature on swelling of impact modified polypropylene with the gel of the present invention.

FIG. 3 illustrates the effect of temperature on gel swelling. The reported results are based upon 30 days immersion at the respective temperatures. After 30 days immersion, no significant changes in gel absorption were noted for the samples. The results in FIG. 3 illustrate that the swelling interaction is driven by the entropy of mixing due to the temperature dependence. The mixing or swelling of the polymer by the gel increases as temperature increases. The results shown in FIG. 3 also illustrate that the gel of the present invention ("improved gel") causes less than 1% swelling in the nucleated, impact modified polypropylenes at temperatures below 60° C., which is the normal operating range of optical fiber telecommunications cables.

Figure 4:
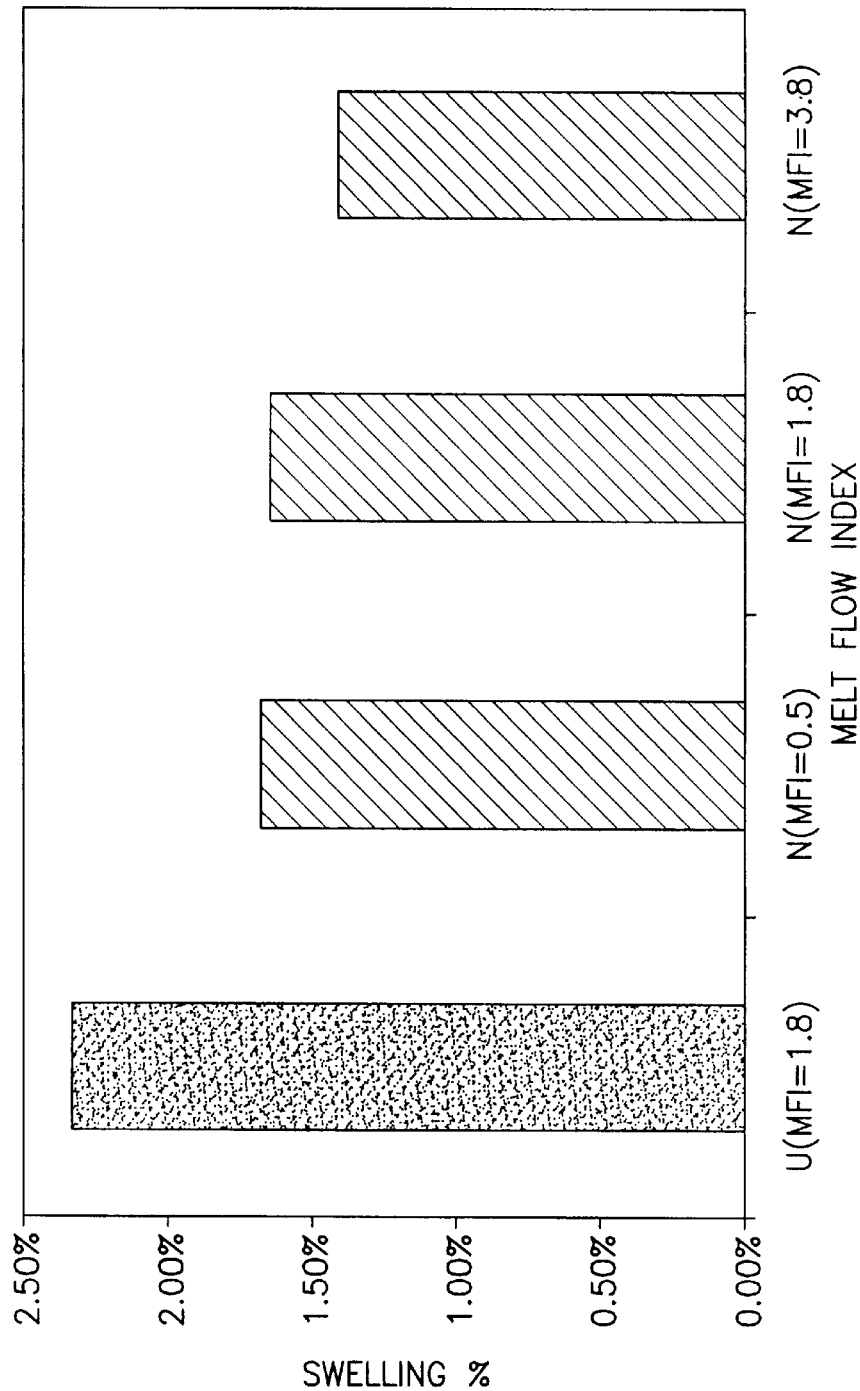
FIG. 4, which is a graphical illustration of the effects of melt flow index and nucleating agent on uptake of the gel of the present invention.

FIG. 4 illustrates the effect of changing the grade of polypropylene on swelling of the gel of the present invention ("improved gel"). Swelling results were measured after 30 days immersion at 85° C. with 4 different grades of polypropylene. All materials were impact modified polypropylene with 8–10% ethylene comonomer. Sample U(MFI=1.8) was a non-nucleated grade of impact modified polypropylene with a melt flow index (ASTM 1238-57T) of 1.8. The other samples were nucleated impact modified polypropylenes with MFI values of 0.5, 1.8, and 3.8. The non-nucleated impact polypropylene had an increased swelling interaction with the gel. The nucleated material with the highest melt flow index had the least swelling.

Figure 5:
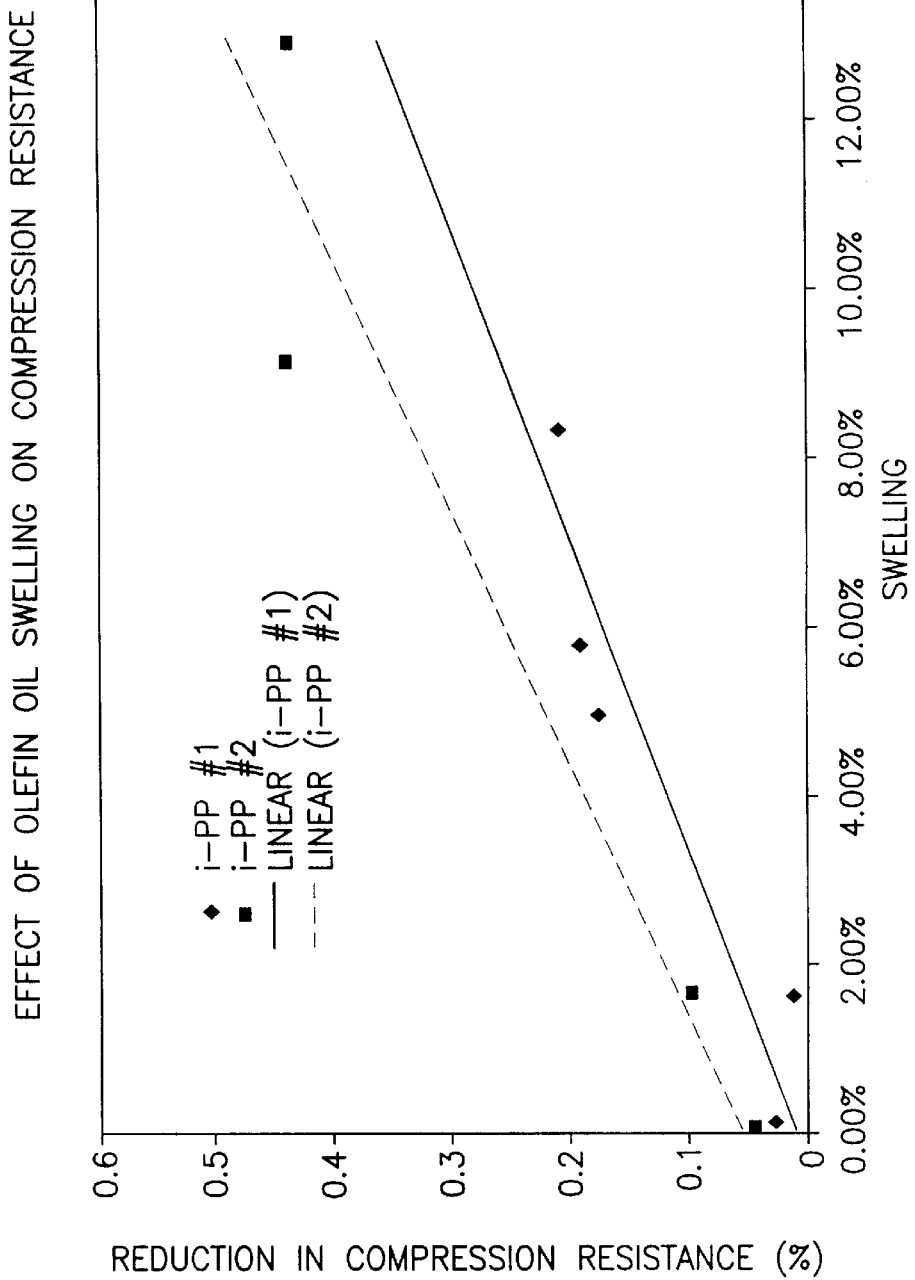
FIG. 5, which is a graphical illustration of the effect of olefin oil swelling on compression resistance.

FIG. 5 illustrates how the absorption of gels can reduce mechanical properties such as compression resistance. Reduction in compression resistance of buffer tubes as a function of swelling mass uptake is recorded for two grades of impact modified polypropylene which were exposed to various gels.

Figure 6:
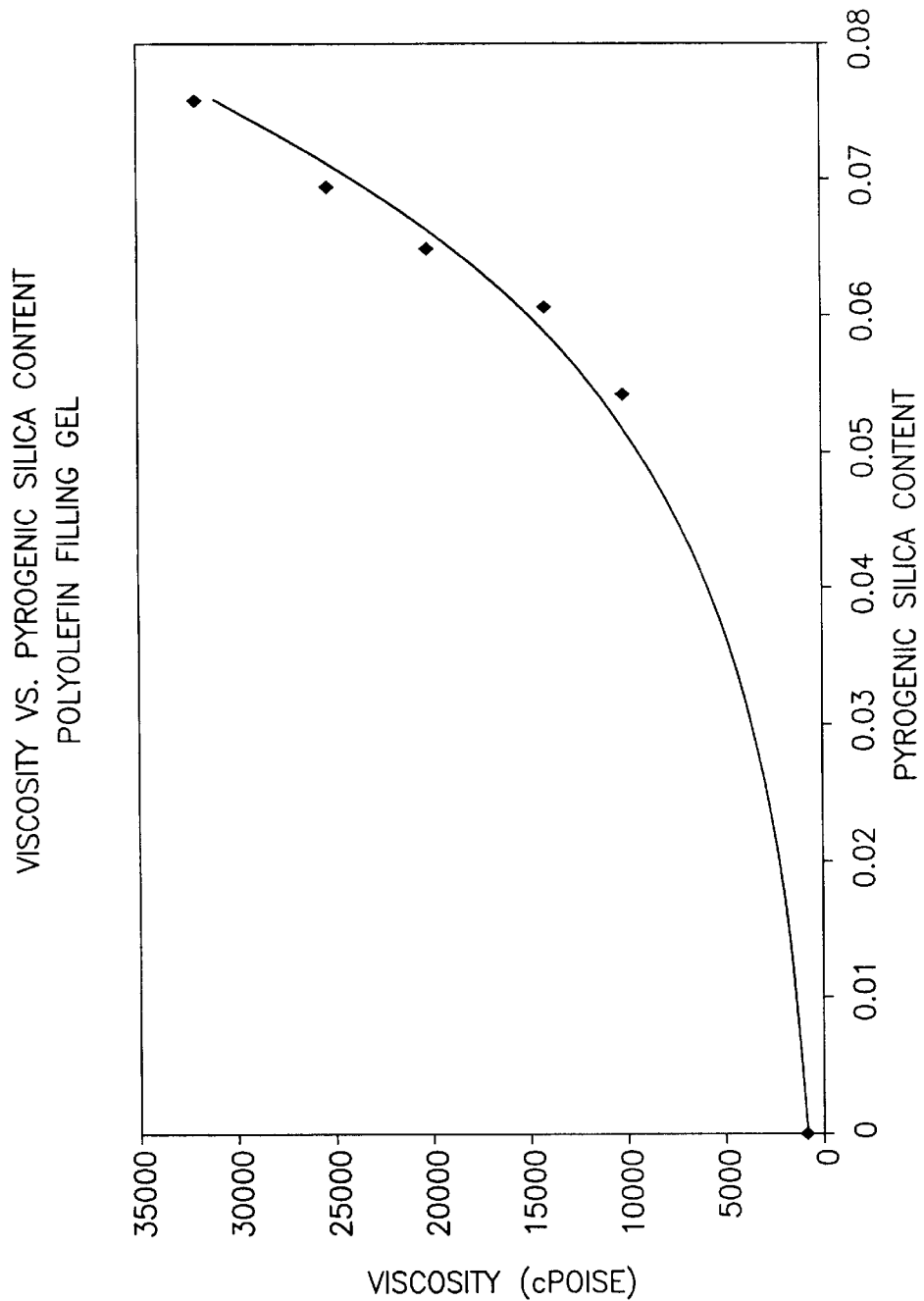
FIG. 6, which is a graphical illustration of the relationship between viscosity and pyrogenic silica content in the gel.

FIG. 6 illustrates the effect of (hydrophobic) pyrogenic silica on viscosity of a polyolefin filling gel based on polyolefin oil with viscosity of 865 centipoise. The viscosity was measured on a cone and plate viscometer at room temperature and at shear rate $20\ s^{-1}$.

Figure 7A:
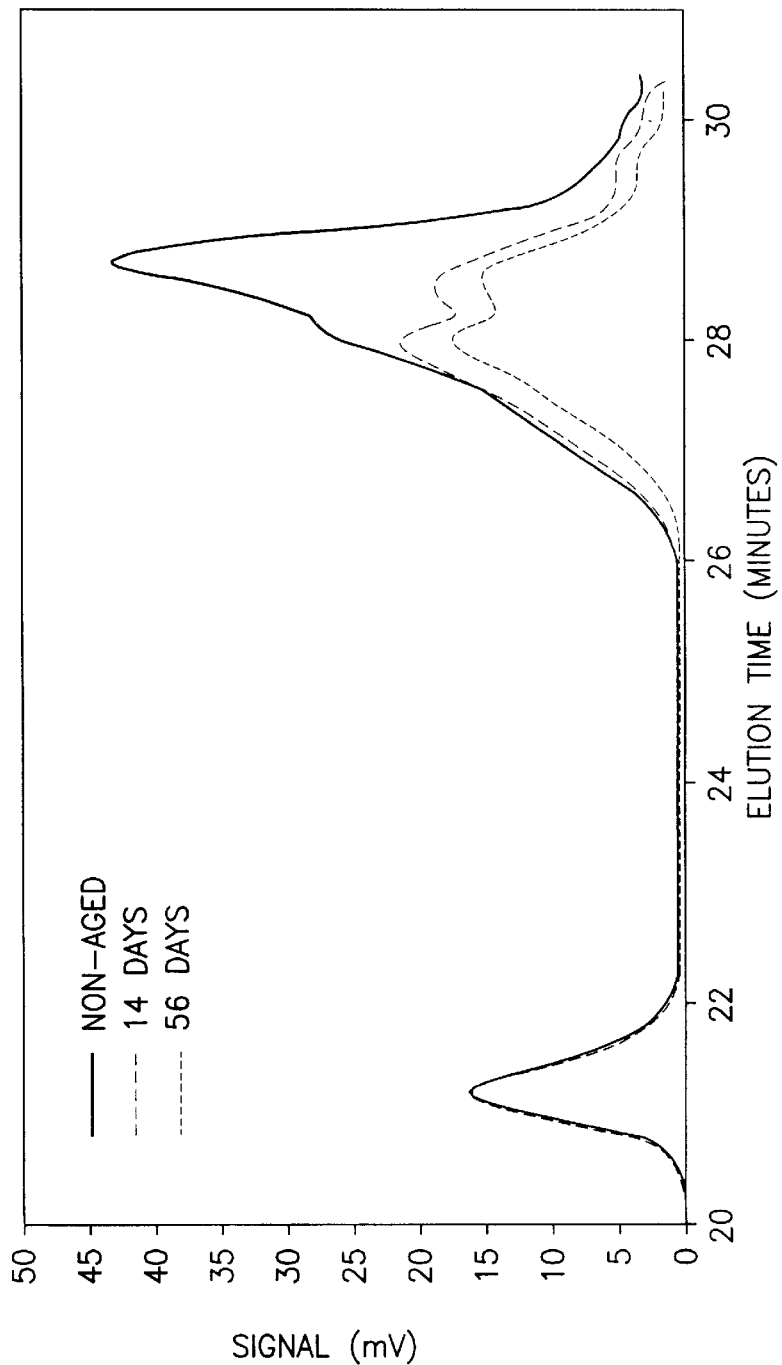

FIG. 7A illustrates GPC data obtained on a polyolefin based gel using tetrahydrofuran (THF) as a solvent at 45° C. FIG. 7B illustrates the data from FIG. 7B once it is calibrated for molecular weight using a universal calibration and polystyrene calibration standards (as in ASTM 3593-80). Henkel CF-300 & CF-260, Astor Rheogel 250, and Huber LA-444 all have a molecular weight distribution similar to that shown in FIG. 7B. The GPC data illustrates that this gel is composed of two major soluble components: one which has a peak molecular weight at about 24,000 Daltons and another with a molecular weight peak at about 1,400 Daltons. After aging for 14 and 56 days in an impact modified polypropylene buffer tube at 85° C., a significant reduction in the peak at 1,400 Daltons is evident while the peak at 24,000 Daltons is relatively unaffected. A reduction in total peak volume at 1,400 Daltons of 45% is evident after 14 days aging, and a reduction of 57% is evident after 56 days. The reduction in the low molecular weight peak indicates that low molecular weight oil fraction is being preferentially extracted by the buffer tubes. Closer evaluation of the low molecular weight peaks especially at 14 and 56 days aging reveals that the low molecular weight fraction has a bimodal molecular weight distribution and the lower molecular weight fraction is absorbed at a more rapid rate than the higher molecular weight component. FIGS. 7A & B clearly show that the lower molecular weight oil fractions are those absorbed by the buffer tubes.

Figure 8:
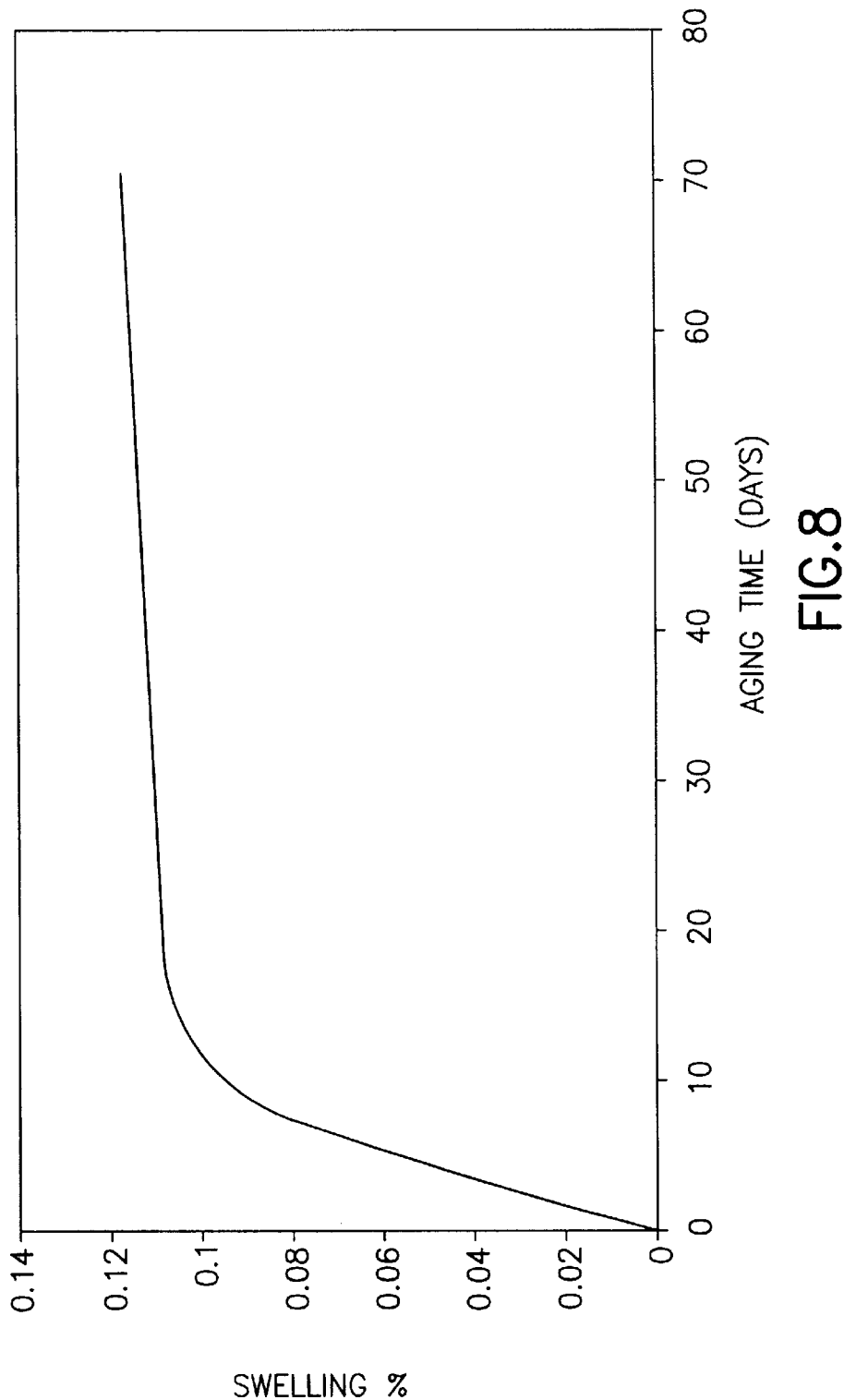
FIG. 8 is a graphical illustration of the swelling of impact polypropylene buffer tube material as a function of aging time at 85° C.

FIG. 8 shows the swelling of the impact polypropylene buffer tube material by the same gel that was analyzed in FIGS. 7A & B. The results for FIGS. 7A & B were obtained by immersing plaques of impact modified polypropylene buffer tube material in the polyolefin gel at 85° C. and measuring weight uptake with time. The swelling test simulated the conditions that were used to create the GPC data for FIGS. 7A & B. FIGS. 7A, 7B and 8 in combination clearly show that the low molecular weight species from the gel causes swelling of the buffer tube material. These low molecular weight oils are selectively absorbed by the buffer tube material while the higher molecular weight fractions above a molecular weight of about 4000 are relatively unaffected by the swelling interaction. Reduction of the interaction between buffer tube filling gel and buffer tube can also lead to improvements in buffer tube reliability.

Figure 9:
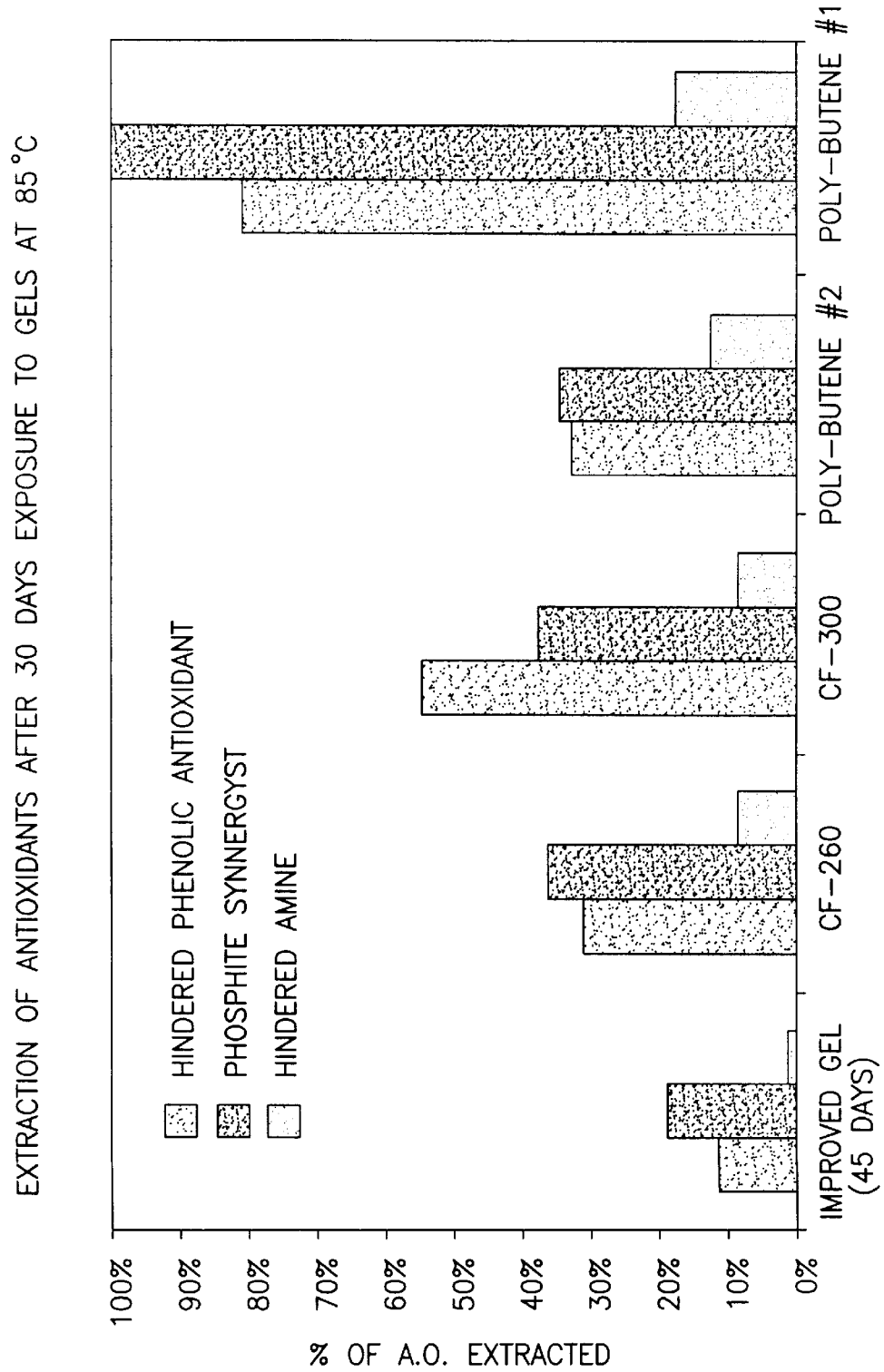
FIG. 9 is a graphical illustration of the extraction of antioxidants from the buffer tube material after 30 days exposure to the gel of the present invention.

FIG. 9 illustrates the extraction of antioxidants from impact modified polypropylene buffer tubes which were exposed to various filling gels at 85° C. The amount of residual antioxidant was measured using fourier transform infrared (FTIR) spectroscopy on buffer tube samples. The migration of antioxidant is a complicated phenomenon that is dependent on concentration of antioxidant in the buffer tube material, concentration of antioxidant in the gel, as well as the gel-polymer interaction. Even after a 45-day exposure, the gel of the present invention ("improved gel") shows less extraction of the antioxidants than the other gels.

Figure 10:
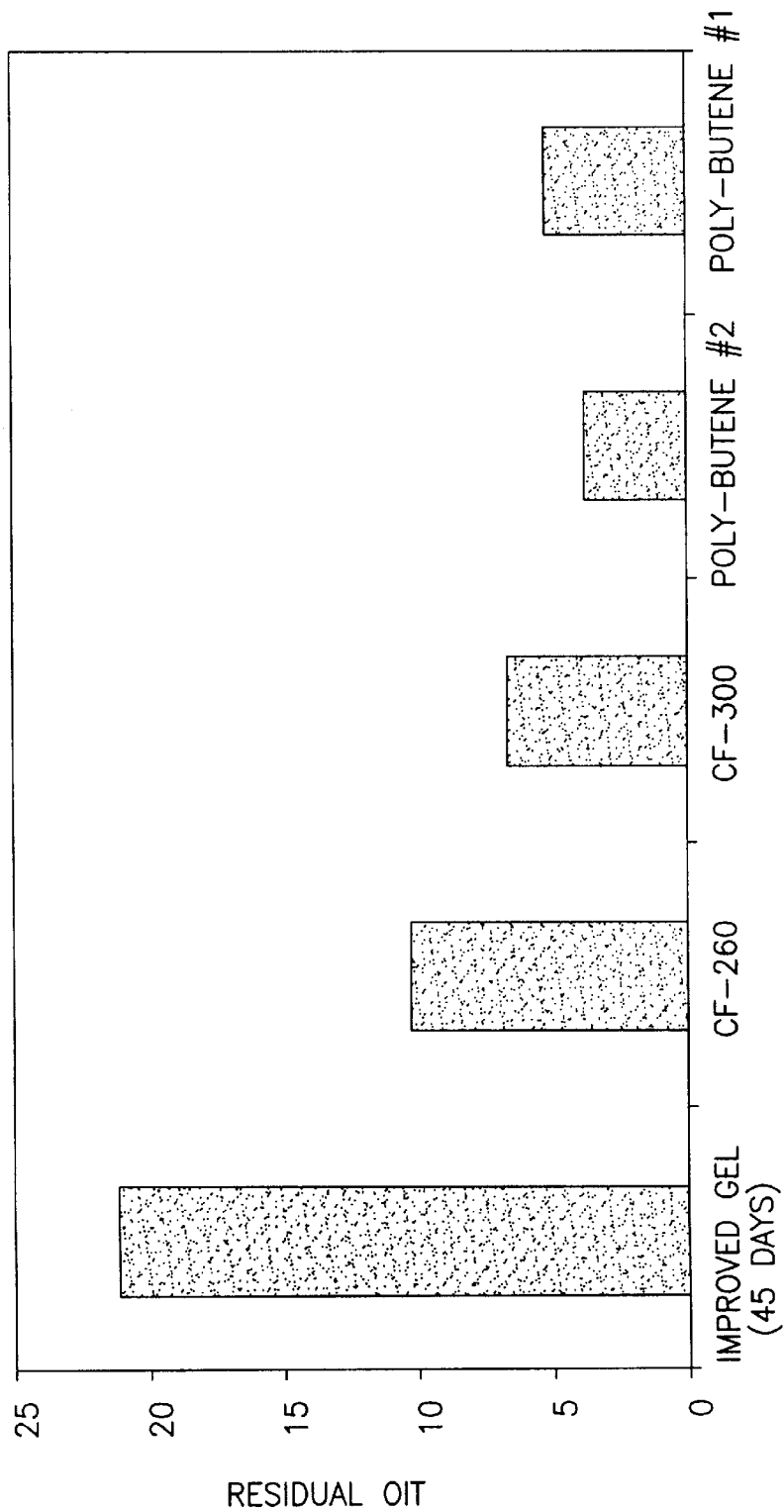
FIG. 10 is a graphical illustration of the residual OIT of impact modified polypropylene buffer tube material aged 30 days at 85° C. in various gels.

FIG. 10 illustrates the effect of reduced antioxidant extractability and gel interaction on residual buffer tube oxidation induction time (OIT) for impact polypropylene buffer tubes. OIT determinations were carried out according to ASTM D3895 except that aluminum sample pans were used instead of copper since copper has been shown to catalyze some degradation reactions in polyolefins resulting in reduced OIT values as well as variability of test results depending on the state of oxidation of the pan's surface. Even after 45 days exposure at 85° C., residual OIT values were higher for buffer tubes exposed to the gel of the present invention ("improved gel") versus other filling gels.

Figure 11:
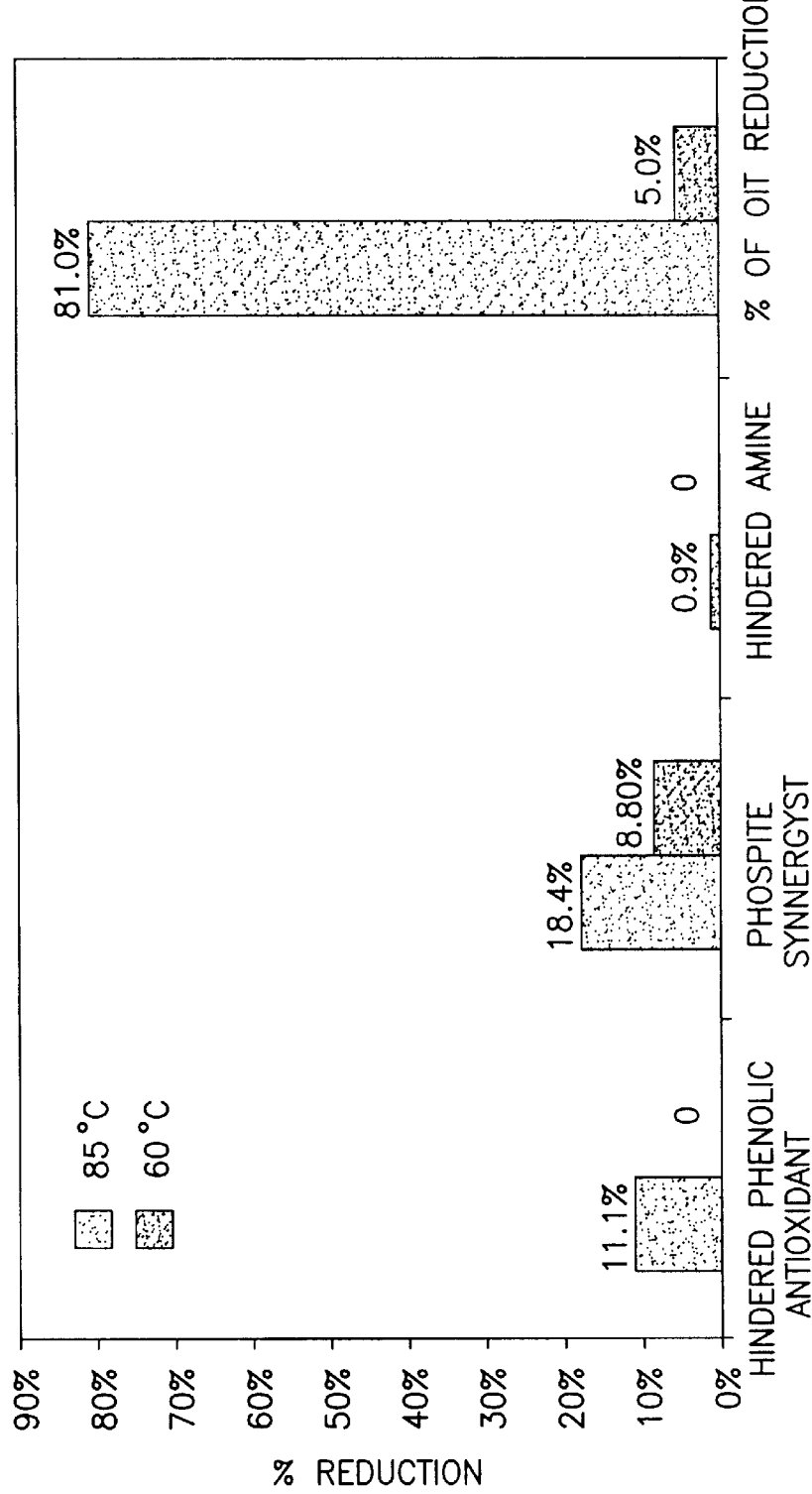
FIG. 11 is a graphical illustration of the effect of temperature on antioxidant extraction and residual OIT with the polyolefin gel of the present invention.

FIG. 11 illustrates the effect of temperature on antioxidant extraction and residual OIT with impact polypropylene buffer tubes. Due to a further reduction in the swelling interaction of the gel of the present invention at temperatures of 60° C. or lower, the extraction of all antioxidants except for the hindered phenolic is reduced below measurable limits. The residual OIT is only reduced by 5% of an unaged buffer tube.

It can be seen from the foregoing disclosure and series of examples that the present invention offers substantial advantages. The embodiments disclosed herein achieve the object of the invention; however, it should be appreciated by those skilled in the art that departures can be made from the following claims without parting from the spirit and scope of the invention.

What is claimed is:

1. An optical fiber cable comprising:
  a buffer tube made from a polyolefin resin material;
  at least one optical fiber disposed in the buffer tube; and
  a water blocking gel disposed in the buffer tube, wherein the water blocking gel further comprises a polyolefin oil, a thixotropic agent and a thermal oxidation stabilizer, wherein less than about 3 weight percent of the polyolefin species in the oil have a molecular weight below about 2000.

2. The optical fiber cable of claim 1, wherein the polyolefin oil is an alpha-polyolefin oil.

3. The optical fiber cable of claim 2, wherein the alpha-polyolefin oil in the gel is selected from the group consisting of polybutene, poly-n-decene, poly-n-pentene, poly-n-hexene, poly-n-octene, and fractionated mineral oil.

4. The optical fiber cable of claim 3, wherein the thixotropic agent is selected from the group consisting of fumed silica, a pseudoplasticity modifier and a polymeric thixotropic material.

5. The optical fiber cable of claim 4, wherein the thixotropic agent is hydrophobic fumed silica.

6. The optical fiber cable of claim 4, wherein the thermal oxidation stabilizer is selected from the group consisting of hindered phenolics, hindered amines and phosphite synergists.

7. The optical fiber cable of claim 6, wherein the polyolefin resin material contains a nucleating agent.

8. The optical fiber cable of claim 7, wherein the polyolefin resin material is a polypropylene-polyethylene copolymer.

9. The optical fiber cable of claim 8, wherein the polyolefin oil comprises about 88 to 95 weight percent polybutene, wherein the thixotropic agent comprises about 5 to 10 weight percent fumed silica and wherein the thermal oxidation stabilizer comprises about 0.1 to 2 weight percent hindered phenolic.

10. The optical fiber cable of claim 1, wherein the polyolefin oil comprises about 88 to 95 weight percent poly-n-decene, wherein the thixotropic agent is about 5 to 10 weight percent fumed silica and the thermal oxidation stabilizer is about 0.1 to 1.5 weight percent hindered phenolic and about 0.1 to 0.5 weight percent hindered amine.

11. The optical fiber cable of claim 10, wherein the polyolefin resin material contains a nucleating agent.

12. The optical fiber cable of claim 11, wherein the polyolefin resin material is a polypropylene-polyethylene copolymer.

13. The optical fiber cable of claim 1, wherein the polyolefin oil comprises an oil mixture of about 10 to 50 weight percent polybutene and about 50 to 90 weight percent poly-n-decene, and wherein the oil mixture comprises between 88 and 95 weight percent of the gel, and the thixotropic agent comprises about 5 to 10 weight percent hydrophobic fumed silica and the thermal oxidation stabilizer comprises about 0.1 to 2 weight percent.

14. The optical fiber cable of claim 13, wherein the polyolefin resin material contains a nucleating agent.

15. The optical fiber cable of claim 14, wherein the polyolefin resin material is a polypropylene-polyethylene copolymer.

16. A water blocking gel for disposition in a polyolefin optical fiber cable buffer tube, the water blocking gel comprising:
  a polyolefin oil, wherein less than about 3 weight percent of the polyolefin species in the oil have a molecular weight below about 2000;
  a thixotropic agent; and
  a thermal oxidation stabilizer.

17. The water blocking gel of claim 16, wherein the polyolefin oil is an alpha-polyolefin oil.

18. The water blocking gel of claim 17, wherein the alpha-polyolefin oil in the gel is selected from the group consisting of polybutene, poly-n-decene, poly-n-pentene, poly-n-hexene, poly-n-octene, and fractionated mineral oil.

19. The water blocking gel of claim 18, wherein the thixotropic agent is selected from the group consisting of fumed silica, a pseudoplasticity modifier and a polymeric thixotropic material.

20. The water blocking gel of claim 19, wherein the thixotropic agent is hydrophobic fumed silica.

21. The water blocking gel of claim 19, wherein the thermal oxidation stabilizer is selected from the group consisting of hindered phenolics, hindered amines and phosphite synergists.

* * * * *